(12) United States Patent
Sanchez

(10) Patent No.: US 10,280,798 B2
(45) Date of Patent: May 7, 2019

(54) ROTATABLE FULL RING FAIRING FOR A TURBINE ENGINE

(71) Applicant: United Technologies Corporation, Hartford, CT (US)

(72) Inventor: Paul K. Sanchez, Wellington, FL (US)

(73) Assignee: United Technologies Corporation, Farmington, CT (US)

(*) Notice: Subject to any disclaimer, the term of this patent is extended or adjusted under 35 U.S.C. 154(b) by 820 days.

(21) Appl. No.: 14/776,719

(22) PCT Filed: Feb. 27, 2014

(86) PCT No.: PCT/US2014/018839
§ 371 (c)(1),
(2) Date: Sep. 14, 2015

(87) PCT Pub. No.: WO2014/189579
PCT Pub. Date: Nov. 27, 2014

(65) Prior Publication Data
US 2016/0032778 A1    Feb. 4, 2016

Related U.S. Application Data

(60) Provisional application No. 61/787,258, filed on Mar. 15, 2013.

(51) Int. Cl.
| *F01D 25/24* | (2006.01) |
| *F02C 7/20* | (2006.01) |
| *B64D 29/08* | (2006.01) |
| *F01D 5/02* | (2006.01) |
| *F01D 9/04* | (2006.01) |
| *F02C 3/04* | (2006.01) |

(52) U.S. Cl.
CPC ............ *F01D 25/246* (2013.01); *B64D 29/08* (2013.01); *F01D 5/02* (2013.01); *F01D 9/041* (2013.01); *F02C 3/04* (2013.01); *F02C 7/20* (2013.01); *F05D 2220/30* (2013.01); *F05D 2240/35* (2013.01)

(58) Field of Classification Search
CPC ..... F01D 5/02; F01D 9/02; F01D 9/04; F01D 9/041; F01D 9/042; F01D 21/003; F01D 25/14; F01D 25/24; F01D 25/246; F01D 25/28; F05D 2240/11; F05D 2240/14; B64D 29/08
See application file for complete search history.

(56) References Cited

U.S. PATENT DOCUMENTS 5,020,318 A  6/1991  Vdoviak
5,443,229 A  8/1995  O'Brien et al.
(Continued)

OTHER PUBLICATIONS

International Preliminary Report on Patentability for PCT Application No. PCT/US2014/018839, dated Sep. 24, 2015.
(Continued)

*Primary Examiner* — Carlos A Rivera
*Assistant Examiner* — Danielle M. Christensen
(74) *Attorney, Agent, or Firm* — Carlson, Gaskey & Olds, P.C.

(57) ABSTRACT

A turbine engine includes a full ring fairing having at least a first and second keyed feature. The full ring fairing is rotatable so that the second keyed feature is in the first keyed feature position relative to the turbine engine.

15 Claims, 4 Drawing Sheets

(56) References Cited

U.S. PATENT DOCUMENTS

| | | |
|---|---|---|
| 6,468,033 B1 | 10/2002 | Weidlich |
| 6,672,833 B2 | 1/2004 | MacLean et al. |
| 8,182,204 B2 | 5/2012 | Durocher et al. |
| 8,357,500 B2 | 1/2013 | Younossi et al. |
| 2005/0132715 A1 | 6/2005 | Allen, Jr. et al. |
| 2008/0022692 A1 | 1/2008 | Nagendra et al. |
| 2010/0215477 A1 | 8/2010 | Wilson |
| 2010/0275572 A1 | 11/2010 | Durocher et al. |
| 2011/0030336 A1* | 2/2011 | Kuehn .................. F01D 5/022 60/226.1 |
| 2011/0113748 A1 | 5/2011 | Lains et al. |

OTHER PUBLICATIONS

International Search Report for PCT Application No. PCT/US2014/018839, dated Dec. 24, 2014.

* cited by examiner

ROTATABLE FULL RING FAIRING FOR A TURBINE ENGINE

TECHNICAL FIELD

The present disclosure relates generally to turbine engine fairings, and more particularly to a rotatable full ring fairing.

BACKGROUND OF THE INVENTION

Turbine engines, such as those utilized in commercial aircraft, often include vane assemblies within the turbine, compressor, and the mid-turbine frame. The vane assemblies are referred to as fairings. One type of fairing utilized in some example turbine engines is a full ring fairing, where the entirety of the fairing is constructed of a single, monolithic piece. The fairings are subject to a flowpath environment which is hot, and can include circumferential hot spots where a portion of the full ring fairing undergoes more wear relative to the remainder of the full ring fairing. As the full ring fairing is a single integral component, the entire component is scrapped or repaired when the wear at the hot spots exceeds a wear threshold, even when the remainder of the full ring fairing does not require repairs.

Thus, the hot spots limit the life of the full ring fairing to the lifespan of the wear at the hot spot specifically, and the potential lifespan of the full ring fairing is reduced.

SUMMARY OF THE INVENTION

A turbine engine according to an exemplary embodiment of this disclosure, among other possible things includes, a compressor section, a combustor in fluid communication with the compressor section, and a turbine section in fluid communication with the combustor, the turbine section includes a first turbine portion and a second turbine portion, and at least one full ring fairing located within the turbine engine, the full ring fairing includes a first keyed feature in a first position relative to an outer diameter case of the turbine engine, and a second keyed feature, and the full ring fairing is rotatable such that the second keyed feature is in the first position.

A further embodiment of the foregoing turbine engine, includes a mid-turbine frame separating the first turbine portion and the second turbine portion, the mid-turbine frame further includes, an outer diameter case, an inner diameter case radially inward of the outer diameter case, and a full ring fairing between the outer diameter case and the inner diameter case.

In a further embodiment of the foregoing turbine engine, each of the keyed features is a borescope port.

In a further embodiment of the foregoing turbine engine, each of the keyed features is evenly distributed circumferentially about the full ring fairing.

In a further embodiment of the foregoing turbine engine, the full ring fairing includes a symmetrical cross section normal to a centerline axis of the turbine engine.

In a further embodiment of the foregoing turbine engine, the symmetrical cross section is radially symmetrical.

In a further embodiment of the foregoing turbine engine, the full ring fairing further includes an elevated wear region, and the elevated wear region is subject to elevated wear relative to a remainder of the full ring fairing during operation of the turbine engine.

In a further embodiment of the foregoing turbine engine, the full ring fairing comprises a plurality of vanes and platforms and the vanes and platforms are integrated as a single component.

A method of maintaining a turbine engine according to an exemplary embodiment of this disclosure, among other possible things includes rotating a full ring fairing within the turbine engine during maintenance, such that a portion of the full ring fairing exposed to elevated wear relative to a remainder of the full ring fairing is rotated away from a hot spot, thereby exposing a second portion of the full ring fairing to the elevated wear and distributing lifetime wear circumferentially about the full ring fairing.

A method of turbine engine full ring fairing according to an exemplary embodiment of this disclosure, among other possible things includes a first keyed feature in a first position, at least a second keyed feature, and the full ring fairing is rotatable such that the second keyed feature is in the first position.

In a further embodiment of the foregoing turbine engine full ring fairing, each of the first keyed feature and the at least a second keyed feature are identical.

In a further embodiment of the foregoing turbine engine full ring fairing, each of the keyed features is a borescope port.

In a further embodiment of the foregoing turbine engine full ring fairing, each of the keyed features is evenly distributed circumferentially about the full ring fairing.

In a further embodiment of the foregoing turbine engine full ring fairing, the full ring fairing includes a symmetrical cross section normal to an engine centerline axis.

In a further embodiment of the foregoing turbine engine full ring fairing, the symmetry is radial symmetry.

In a further embodiment of the foregoing turbine engine full ring fairing, a portion of the full ring fairing is subject to elevated wear relative to a remainder of the full ring fairing during operation of the turbine engine.

In a further embodiment of the foregoing turbine engine full ring fairing, the full ring fairing comprises a plurality of vanes and platforms and the vanes and platforms are integrated is a single component.

These and other features of the present invention can be best understood from the following specification and drawings, the following of which is a brief description.

DETAILED DESCRIPTION OF AN EMBODIMENT

Figure 1:
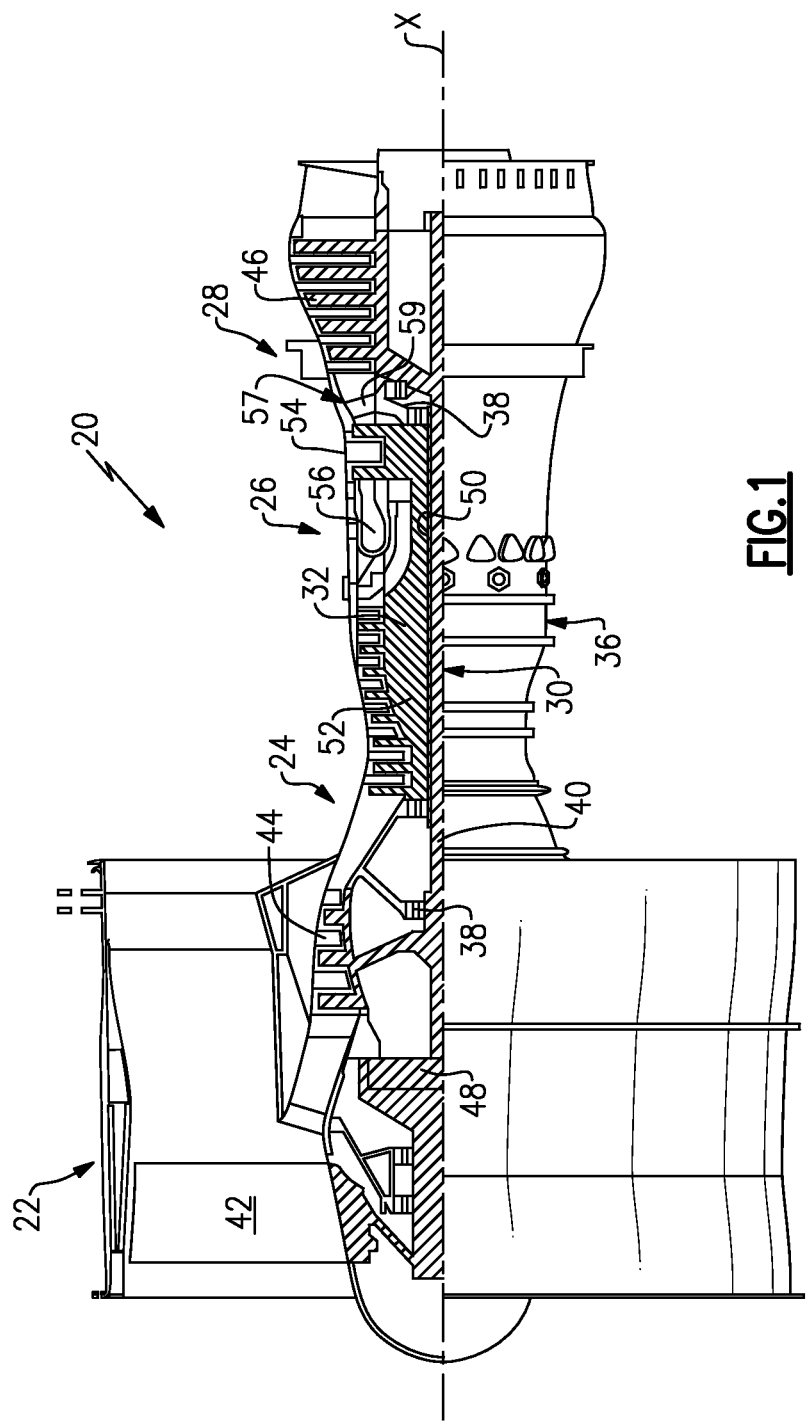
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 50 may be varied. For example, gear system 50 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
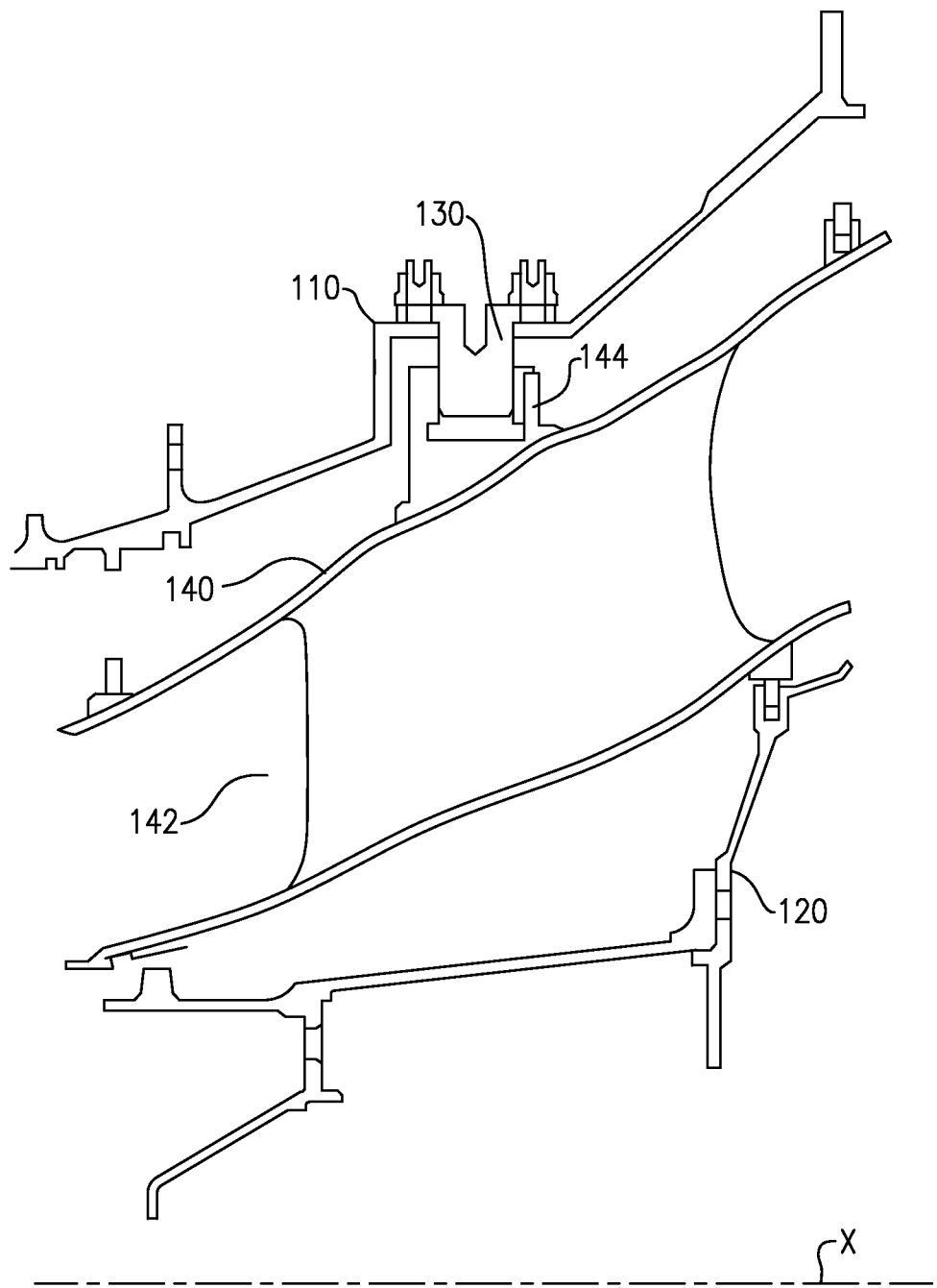
FIG. 2 schematically illustrates a mid-turbine frame of a gas turbine engine.

FIG. 2 schematically illustrates a partial cross section of the mid-turbine frame 57 illustrated in FIG. 1. The mid-turbine frame 57 is positioned between, and provides structural support to, an outer diameter case 110 and an inner diameter case 120 of the turbine engine 20. The outer diameter case 110 is connected to a full ring fairing 140 via a retention pin 130 that is received in a pin bushing 144 on the full ring fairing 140. A gas flow path 142 passes through the mid-turbine frame full ring fairing 140 and allows gas to flow from a first turbine section on a fore side of the mid turbine frame full ring fairing 140 to a second turbine section on an aft side of the mid turbine frame full ring fairing 140. The mid turbine frame full ring fairing 140 includes multiple vanes 230 supported by platforms 250 (illustrated in FIG. 3). The vanes 230 and platforms 250 control airflow and impart desirable airflow characteristics on air flowing through the fairing gas path 142. The mid-turbine frame 57 is static, meaning that the mid-turbine frame 57 and the full ring fairing 140 do not rotate during operation of the turbine engine 20.

The spokes 130 maintain the full ring fairing 140 in position relative to the inner and outer diameter cases 110, 120 of the mid-turbine frame 57. The spokes 130 extend into the full ring into the fairing 140 and are centered using multiple spoke centering pins 144 distributed circumferentially about the mid-turbine frame full ring fairing 140. The spokes 130 and the multiple spoke centering pins 144 are distributed evenly about the mid-turbine frame full ring fairing 140 such that a cross sectional plane normal to the engine centerline axis of the mid-turbine frame full ring fairing 140 is symmetrical. In the specific illustrated embodiments, the cross section of the mid-turbine frame full ring fairing 140 is radially symmetrical.

At least two of the spoke centering pins 144 are also borescope ports and allow a maintenance worker to view inside the engine 20 without dismantling the engine 20. In order for the borescope feature to be functional, the borescope port is aligned with a corresponding borescope port on the outer diameter casing 110. As one of the borescope parts must be aligned with the outer diameter case 110 borescope port to enable this feature, the possible orientations of the full ring fairing 140 are limited, and the feature is referred to as a "keying feature." In general terms a keyed feature is any feature of a full ring fairing that requires the full ring fairing 140 to be installed in a particular orientation (at a particular clock position).

The illustrated mid-turbine frame full ring fairing 140 is a single monolithic piece. Similarly, other fairings within the turbine engine can also be constructed as full ring fairings and include keyed features. While the keyed feature described in the present disclosure is a borescope port, it is understood that alternate full ring fairings can include alternate keyed features and still achieve the described benefit.

Figure 3A:
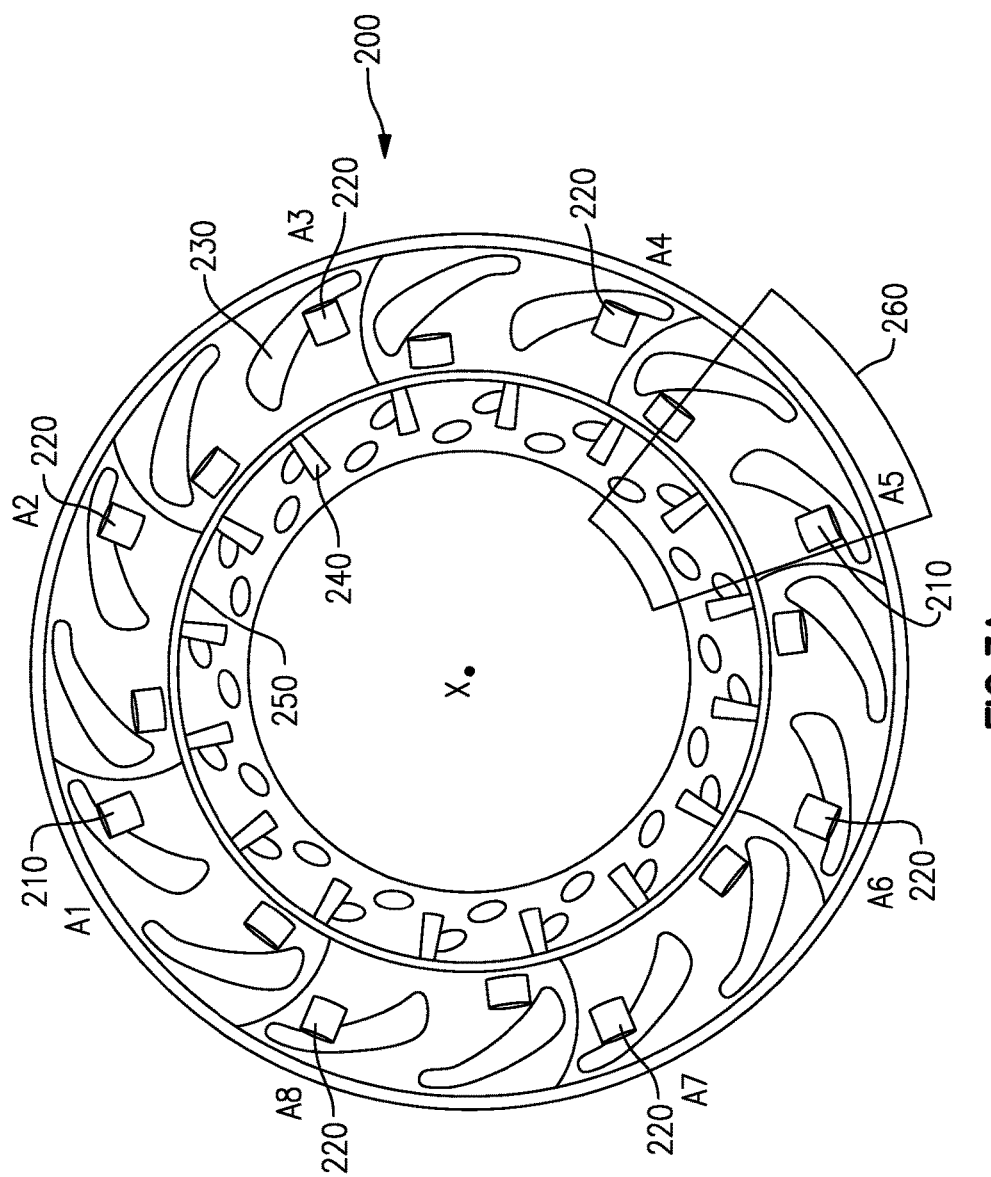
FIG. 3A illustrates a cross section of a mid-turbine frame normal to an engine centerline axis.
Figure 3B:
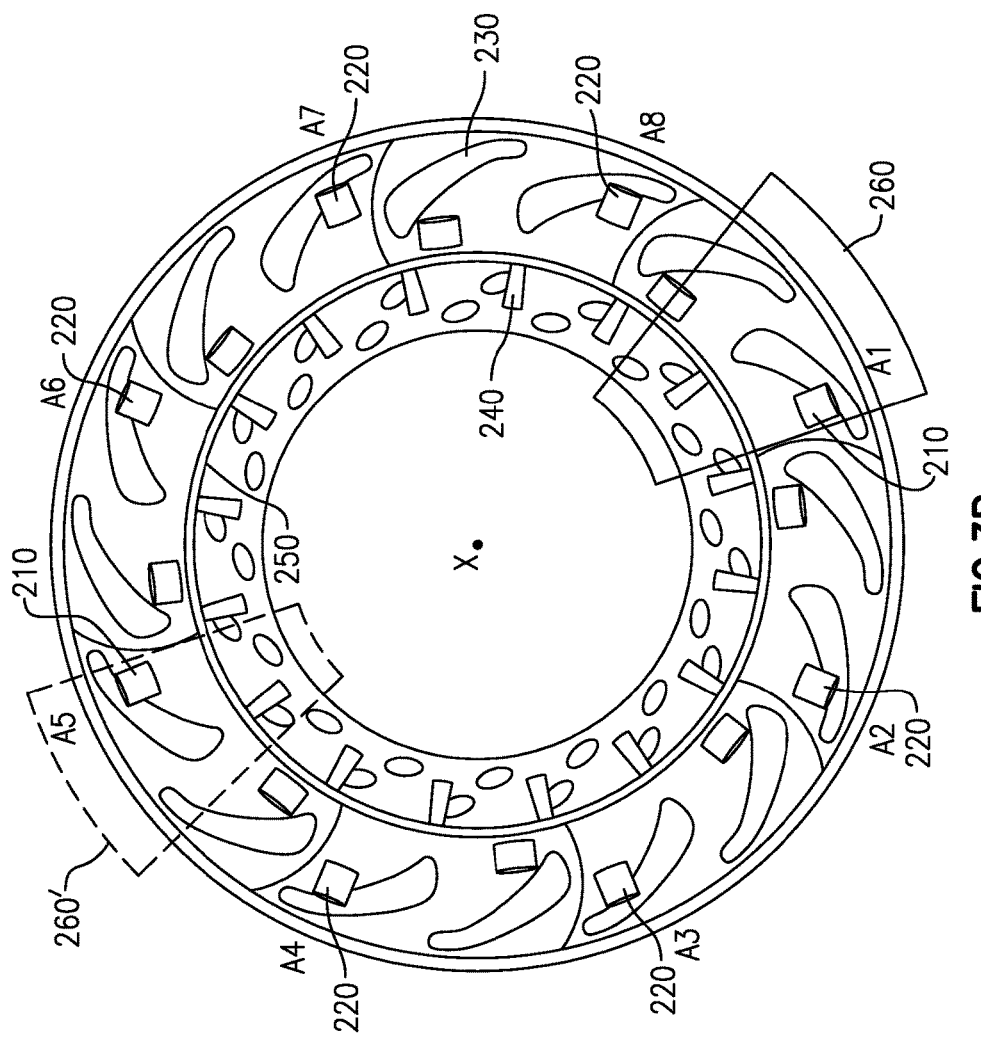
FIG. 3B illustrates a cross section of a mid-turbine frame normal to an engine centerline axis.

FIGS. 3A and 3B illustrate a forward view of the full ring fairing 200, viewed from a plane normal to the engine centerline axis X. FIG. 3A illustrates the full ring fairing 200 in a first (clock position) upon installation of the full ring fairing 200. The full ring fairing 200 of FIGS. 3A and 3B includes six spoke centering pins 220 and two borescope port spoke centering pins 210. The centering pins 210, 220 are arranged evenly about the circumference of the full ring fairing 140 creating a radially symmetrical full ring fairing 200. One of the borescope spoke centering pins 210 is aligned with a borescope port on the outer diameter case 110 (illustrated in FIG. 2) at position A1.

While the full ring fairing 200 is radially symmetrical, it is understood that other portions of the turbine engine 20 are not radially symmetrical. As a result of the dissymmetry in the turbine engine 20, a hot spot 260 exists where the full ring fairing 200 encounters an elevated wear relative to the wear experienced by the remainder of the full ring fairing 200. This hot spot 260 is alternately referred to as an elevated wear region. Since the full ring fairing 200 is a single monolithic piece, when the wear in the hot spot 260 exceeds allowable levels, the entire full ring fairing 200 is removed and repaired or replaced.

In order to reduce the wear experienced by the full ring fairing 200 of the hot spot 260, the full ring fairing 200 is rotated, or clocked, after a predetermined length of operation. By way of example, the full ring fairing 200 can be clocked during each scheduled maintenance, every other scheduled maintenance, or at some other determined frequency. FIG. 3B illustrates the same full ring fairing 200 as is illustrated in FIG. 3A after being clocked during a scheduled maintenance, with like numerals indicating like elements. Once clocked, the portion of the full ring fairing 200 that was previously exposed to the hot spot 260 is rotated away from the hotspot to position 260' and a new portion of the full ring fairing 200 is exposed to the elevated wearing of the hot spot 260. In this way, the wear on the full ring fairing 200 is distributed across the full ring fairing 200, and the lifetime of the full ring fairing 200 is correspondingly extended.

While the illustrated examples of FIGS. 3A and 3B utilize only two keyed features (the borescope port spoke centering pins 210), it is understood that the number of keyed features can be increased as dictated by system design, provided radial symmetry of the full ring fairing is maintained. In order to implement a system including more than two identical keyed features, the full ring 200 fairing is clocked to shift a radially adjacent keyed feature into the elevated wear position with the rotation not being limited to 180 degrees.

A worker skilled in the art can determine the frequency at which the full ring fairing should be clocked by using field data for a particular engine to determine what region of the full ring fairing 200 is exposed to the highest wear. In some examples, this corresponds to the hottest region. Once the elevated wear region has been determined, a skilled worker can determine the frequency that the full ring fairing 200 should be clocked, and the clocking can be incorporated into a standard maintenance schedule.

It is further understood that increasing the number of keyed features in a full ring fairing can incur associated drawbacks. With reference to FIGS. 3A and 3B above, each borescope port 210 requires a plug to prevent airflow from leaking from the flowpath through the full ring fairing 200 and thereby causing efficiency losses. All known plug techniques do not provide a complete seal, and even with the borescope ports 210 plugged, air leakage will occur. Thus the number of borescope ports 210 utilized in a particular embodiment is counterbalanced by the maximum amount of allowable leakage.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbine engine comprising:
a compressor section;
a combustor in fluid communication with the compressor section; and
a turbine section in fluid communication with the combustor, wherein said turbine section includes a first turbine portion and a second turbine portion; and
at least one full ring fairing located within a mid-turbine frame of said turbine engine, wherein said full ring fairing includes a first keyed feature in a first position relative to an outer diameter case of said turbine engine, and a second keyed feature, wherein said full ring fairing is rotatable such that said second keyed feature is in said first position, and wherein the mid-turbine frame separates the first turbine portion and the second turbine portion.

2. A turbine engine comprising:
a compressor section;
a combustor in fluid communication with the compressor section; and
a turbine section in fluid communication with the combustor, wherein said turbine section includes a first turbine portion and a second turbine portion; and
a mid-turbine frame separating said first turbine portion and said second turbine portion;
said mid-turbine frame further comprising;
an outer diameter case;
an inner diameter case radially inward of said outer diameter case; and
at least one full ring fairing located within said turbine engine between the outer diameter case and the inner diameter case, wherein said full ring fairing includes a first keyed feature in a first position relative to the outer diameter case of said turbine engine, and a second keyed feature, and wherein said full ring fairing is rotatable such that said second keyed feature is in said first position.

3. A turbine engine comprising:
a compressor section;
a combustor in fluid communication with the compressor section; and
a turbine section in fluid communication with the combustor, wherein said turbine section includes a first turbine portion and a second turbine portion; and
at least one full ring fairing located within said turbine engine, wherein said full ring fairing includes a first keyed feature in a first position relative to an outer diameter case of said turbine engine, and a second keyed feature, and wherein said full ring fairing is rotatable such that said second keyed feature is in said first position, and wherein each of said keyed features is a borescope port.

4. The turbine engine of claim 3, wherein each of said keyed features is evenly distributed circumferentially about said full ring fairing.

5. The turbine engine of claim 3, wherein said full ring fairing includes a symmetrical cross section normal to a centerline axis of the turbine engine.

6. The turbine engine of claim 5, wherein said symmetrical cross section is radially symmetrical.

7. The turbine engine of claim 3, wherein said full ring fairing further comprises an elevated wear region, and wherein said elevated wear region is subject to elevated wear relative to a remainder of said full ring fairing during operation of said turbine engine.

8. The turbine engine of claim 3, wherein said full ring fairing comprises a plurality of vanes and platforms and wherein said vanes and platforms are integrated as a single component.

9. A method of maintaining a turbine engine comprising the step of:
rotating a full ring fairing within said turbine engine during maintenance, such that a portion of said full ring fairing exposed to elevated wear relative to a remainder of said full ring fairing is rotated away from a hot spot, thereby exposing a second portion of said full ring fairing to said elevated wear and distributing lifetime wear circumferentially about the full ring fairing.

10. A turbine engine full ring fairing comprising:
a first keyed feature in a first position;
at least a second keyed feature; and
wherein said full ring fairing is rotatable such that said second keyed feature is in said first position, and wherein each of said keyed features is a borescope port.

11. The turbine engine full ring fairing of claim 10, wherein each of said keyed features is evenly distributed circumferentially about said full ring fairing.

12. The turbine engine full ring fairing of claim 10, wherein said full ring fairing includes a symmetrical cross section normal to an engine centerline axis.

13. The turbine engine full ring fairing of claim 12, wherein said symmetry is radial symmetry.

14. The turbine engine full ring fairing of claim 10, wherein a portion of said full ring fairing is subject to elevated wear relative to a remainder of said full ring fairing during operation of said turbine engine.

15. The turbine engine full ring fairing of claim 10, wherein said full ring fairing comprises a plurality of vanes and platforms and wherein said vanes and platforms are integrated is a single component.

* * * * *